United States Patent [19]

Cardon

[11] 3,911,114

[45] Oct. 7, 1975

[54] COMPOSITION AND METHOD FOR TREATING STRESSED RUMINANTS

[75] Inventor: Bartley P. Cardon, Tucson, Ariz.

[73] Assignee: Arizona Feeds, Tucson, Ariz.

[22] Filed: Jan. 26, 1973

[21] Appl. No.: 326,629

[52] U.S. Cl. .............................. 424/128; 424/180
[51] Int. Cl. .................... A61k 27/00; A61k 15/00
[58] Field of Search ........................... 424/128, 180

[56] References Cited
OTHER PUBLICATIONS

The Merck Index – Eighth Edit. (1968) pp. 876 and 877.
Rocks — Chem. Abst. Vol. 75 (1971) pp. 34108 e to 34109.
Carnie — Chem. Abst. Vol. 62 (1965) p. 8933 a.
Veterinary Drug Encyclopedia & Therapeutic Index — 12th Ed. (1964) pp. 25, 33, 57, 108, 109 and 112.
Chem. Abst. — Vol. 75 (1971) p. 3664 s.

*Primary Examiner*—Sam Rosen
*Attorney, Agent, or Firm*—Wills, Green & Mueth

[57] ABSTRACT

Stressed ruminants are treated by directly introducing into the rumens thereof, as by drenching, an aqueous mixture of pregelatinized starch, vitamins and minerals. Other components of the mixture can include a gelling agent, propylene glycol, and chelated trace minerals.

15 Claims, No Drawings

COMPOSITION AND METHOD FOR TREATING STRESSED RUMINANTS

BACKGROUND AND SUMMARY OF THE INVENTION

One of the major problems in the cattle and dairy businesses, is the treatment of "stressed" cattle, that is, cattle which are severely dehydrated or off feed because of a long shipment, separation of calves from cows, or for other reasons.

Ruminants, such as cattle and sheep, have problems different from single-stomached animals because of the impact of the rumen (first large compartment in the stomach) on the physiology and appetite thereof.

When a monogastric (single-stomach) animal stops eating, the energy supply is cut off but no appreciable difficulty develops in the digestive tract. However, when a ruminant stops eating and the energy supply stops, the activity of the microorganisms in its rumen continues. Because there is no fresh influx of food to be acted upon, the microorganisms in the rumen further degrade the material in the rumen and even act upon other microorganisms. This often leads to the production of toxic by-products, or to conditions which adversely affect the animal and often cause "scouring", commonly referred to as diarrhea.

Thus, stressed cattle are not only physically stressed with appreciable greater exposure to infectious diseases, but they are also physiologically stressed. The ultimate result is severe dehydration, scouring and loss of appetite, which lead to an excessive loss of fluids and minerals from the body and a lower energy intake. In addition, depot fat is necessarily metabolized to provide some energy, which usually leads to ketosis, further depressing the appetite and delaying or preventing the recovery of the animal.

I have discovered that the scouring of stressed cattle can be halted, the nutritional balance restored, and energy supplied . . . by treating them with an aqueous mixture containing a relatively large percentage of pregelatinized starch, which mixture is supplied directly to the rumen by a drenching procedure, utilizing a tube inserted down the animal's throat. In addition to the starch, the dry composition includes a concentrated mixture of minerals and vitamins, and energy feed ingredients. These additional ingredients quickly restore the nutritional balance and supply energy to aid in the correction of ketosis. The starch is a critical component of the composition, functioning to alleviate the scouring, and aiding the other components to be effective. Even though the starch is preferably in the pregelatinized form, there is a further advantage in also including a gelling agent in the mixture to assure the early formation of a gel in the animal's rumen. Propylene glycol is included to supply quick energy; electrolytes, phosphorus and calcium salts are provided to restore mineral balance; and chelated trace minerals are used for their greater solubility and to assure immediate availability to the animal. "B" vitamins are supplied to correct any deficiency which may have resulted from the unbalanced rumin activity, and sources of vitamins "A", "D" and "E" are also included to restore a dietetic balance.

Because of these several physiological actions from the pregelatinized starch, it is recognized that its functions are completely different from those of ordinary starch when used as a filler in tablets containing multivitamin compositions, of the type described in U.S. Pat. No. 3,584,114.

DETAILED DESCRIPTION

For simplicity of explanation, the present invention is described as used with stressed cattle, but the invention is equally applicable to the treatment of any ruminant-type animal which is dehydrated and/or off feed for any reason.

Basically, the dry composition comprises about fifty per cent (50%), by weight, of pregelatinized starch, and restorative amounts of vitamins and minerals which are dietetically important to the health of the ruminant, and propylene glycol to provide quick energy.

The dry composition is mixed with lukewarm water at a ratio at about one part composition to eight parts water, by weight, and introduced directly into the animal's rumen through a tube inserted down the ruminant's throat.

Best results have been achieved by administering from about 0.5 to 1.0 pound (on the basis of the dry mixture) to any ruminant animal being treated for scouring and severe dehydration.

It is to be understood that this dry composition does not contain medicinals, and that it achieves the unexpected beneficial results by supplementing the healing influence of any such medicinals introduced into the animal, and also by helping restore the normal physiological balance . . . with the result that the animal starts to eat and recover more quickly.

As mentioned above, pregelatinized starch constitutes the principal ingredient of this novel ruminant treating composition, and it is indicated that any grain or vegetable starch can be used. Starch is a white granular substance which occurs widely in the higher plants, generally in the seeds of such grains as corn and wheat, and in various roots and tubers, such as tapioca and potato. Other sources include rice, arrowroot and sorghum grain. Although any of the starches can be used, corn starch is preferred because it is more economical and readily gelatinized. Also, its granules are often polygonal in shape and smaller in size than the grains of other starches, such as potato starch which has oval granules.

It is to be understood that the term "starch" is meant to describe the separated starch component, and not merely the ground or milled grain or vegetable. By way of example, corn kernels contain about 61% starch, and when separated or extracted, the powdered starch is about 88% pure. Such extracted starch is physically and absorbtively much different than the starch present in milled or ground grain or vegetables.

As mentioned above, inasmuch as it is advantageous to achieve a gelatinized stage in the ruminant as quickly as possible, the novel ruminant composition includes pregelatinized starch so that the starch forms a gel at ordinary body temperatures. Granular starches have low solubility in cold water, such that when a mixture of starch and water is heated beyond a certain temperature (e.g., 147–162 F. for corn starch) the starch gelatinizes, i.e. the granules swell or increase in size to form a viscous solution.

Although I do not intend to rely on any particular theory of operation to explain the unexpected beneficial results which are achieved by the introduction of the pregelatinized starch into the animal's rumen, it appears to perform numerous functions in the rumen when in the form of a gel.

First, it appears to coat the inner wall of the rumen so as to reduce physical irritation, and to function as a constriction or "plug" in the passageways from the rumen, thereby slowing the diarrhea.

Secondly, it absorbs or adsorbs the toxins which are formed in the rumen by the microorganisms, and releases such toxins at a relatively slow rate . . . as the starch is digested . . . such that the animal can handle them at the reduced rate. In this regard, one pound of corn starch is stated to contain about 750 billion granules, each possessing a complex internal structure of concentric onion-like layers. For a reference, see *Corn Starch*, 3rd Edition (1964) by Corn Industries Research Foundation, Inc., Washington, D.C.

Thirdly, and as a function somewhat related to the second function, the starch absorbs or adsorbs the vitamins and minerals and releases them for assimilation by the animal, also as the starch is digested.

And fourthly, the starch itself functions as a source of energy as it is acted upon by the enzymes in the rumen.

Optionally, the dry composition can also contain from about 0.25 to 2.0 percent, by weight, of a gelling agent such as xanthan gum. Even though the starch is pregelatinized, such a gelling agent assures the early and proper formation of a gel in the animal's rumen. However, I have determined that if an excess amount of such a gelling agent is used, as for example, as much as four per cent, by weight, the gelatinized mass becomes too rubbery and will not function properly.

Although the basic dry rumen composition may comprise only the aforementioned pregelatinized starch, vitamins and minerals, the following formulation exemplifies the components in a fully formulated composition:

| Component | Approximate Dry Weight Per Cent |
|---|---|
| starch | 55.5 |
| cerelose | 10.00 |
| dried mild product | 20.00 |
| dried egg | 2.50 |
| sodium phosphate | 1.25 |
| salt | 2.00 |
| calcium lactate | 1.00 |
| potassium chloride | 1.00 |
| vitamin premix | 1.00 |
| chelated trace minerals (ruminant) | .25 |
| propylene glycol | 5.00 |
| gelling agent | 0.5 |
| | 100.00 |

The preferred chelated trace minerals are described in U.S. Pat. No. 2,960,406, and can be obtained from Arizona Feeds, Tucson, Arizona, under the designation "CTM Chelated Trace Minerals (Ruminant)".

The vitamin pre-mix comprises a mixture of vitamins and minerals which are dietically important to the health of the ruminant. such a vitamin premix can be obtained from Hoffman-Taff Inc., under the designation Ruminant Vitamin Premix, and preferably includes vitamin A palmitate, D-activated animal sterol (source of Vitamin D), alpha tocopheryl acetate, riboflavin supplement, niacin, d-pentothenic acid, vitamin $B_{12}$ supplement, menadione sodium bisulfite complex (source of vitamin K), and choline chloride (B complex vitamin).

The preferred pregelatinized corn starch can be obtained from The Hubinger Company, Keokuk, Iowa, under the designation "OK PRE-GEL", which is a pure, highly refined starch which is pregelatinized in water, dehydrated and pulverized to a white, finely granulated solid having a uniform particle size and a moisture content of about 3.5% to 8.0%. The water absorption capacity is greater than 15 to 1.

The dry formulation prepared as above, is mixed in the ratio of about one pound of composition to one gallon of lukewarm water, and fed directly to the rumen through a tube inserted down the throat of the animal. The aqueous mixture is prepared and agitated immediately prior to being administered to the animal. The dry composition readily forms a paste with cold or lukewarm water, and such freshly prepared pastes are fluid and viscous. However, with time and no agitation, a soft textured gel forms.

I have determined that from about 0.5 to 1.0 per pound of the dry material, administered to a stressed ruminant, produces the desired improvement.

I claim:

1. A method for treating stressed ruminant animals, comprising administering directly into the rumen thereof, an effective amount of an aqueous mixture of a composition containing on a dry weight basis, a major proportion of pregelatinized starch and minor proportions of vitamins and minerals which are physiologically beneficial to the ruminant animal being treated.

2. The method of claim 1 in which the mixture is in the ratio of about one part, by weight, of composition, to about eight parts, by weight, of water.

3. The method of claim 1 in which the composition and water are mixed immediately prior to administering the mixture to the animal.

4. The method of claim 1 in which from about 0.5 to about 1.5 pounds of the composition, on a dry weight basis, is administered to the animal.

5. The method of claim 1 in which the starch is corn starch.

6. The method of claim 1 in which the composition also includes a gelling agent.

7. The method of claim 6 in which the gelling agent is xanthan gum.

8. The method of claim 6 in which the amount of gelling agent is no more than about two per cent, by weight, of the composition.

9. The method of claim 1 in which the composition also contains propylene glycol.

10. A method for treating stressed ruminant animals, including the step of depositing on the wall of the rumen of the animal, an effective amount of a starch gel containing vitamins and minerals which are physiologically beneficial to said animal.

11. The method of claim 10 in which the gel also contains propylene glycol.

12. The method of claim 10 in which the gel also contains chelated trace minerals.

13. A drench composition for use in treating stressed ruminant animals, comprising in affective amounts, a major proportion of pregelatinized starch, and minor proportions of vitamins and minerals which are physiologically beneficial to ruminant animals.

14. A drench composition as in claim 13, which also includes a gelling agent.

15. A drench composition as in claim 13, which also includes propylene glycol.

* * * * *

UNITED STATES PATENT OFFICE
CERTIFICATE OF CORRECTION

Patent No. 3,911,114    Dated October 7, 1975

Inventor(s) Bartley P. Cardon, et al

It is certified that error appears in the above-identified patent and that said Letters Patent are hereby corrected as shown below:

Column 3, line 40, "dried mild product" should read -- dried milk product --. Column 4, line 60, "affective" should read -- effective --.

Signed and Sealed this twenty-seventh Day of January 1976

[SEAL]

Attest:

RUTH C. MASON
Attesting Officer

C. MARSHALL DANN
Commissioner of Patents and Trademarks